United States Patent
Sampath et al.

(10) Patent No.: US 10,721,301 B1
(45) Date of Patent: Jul. 21, 2020

(54) GRAPHICAL USER INTERFACE FOR STORAGE CLUSTER MANAGEMENT

(71) Applicant: EMC CORPORATION, Hopkinton, MA (US)

(72) Inventors: Bhuvaneswari Sampath, Chennai (IN); VijayaRagavan Ps, Chennai (IN); Nagaratna Reddy, Mathikere (IN); Priyanka Hiriyanna, Mysore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 926 days.

(21) Appl. No.: 14/721,229

(22) Filed: May 26, 2015

(51) Int. Cl.
*H04L 29/08* (2006.01)
*H04L 12/24* (2006.01)
*G06F 11/32* (2006.01)
*G06F 11/30* (2006.01)

(52) U.S. Cl.
CPC ...... *H04L 67/1097* (2013.01); *G06F 11/3051* (2013.01); *G06F 11/324* (2013.01); *H04L 41/22* (2013.01)

(58) Field of Classification Search
CPC .. G06F 3/0481; G06F 11/324; G06F 11/3051; H04L 67/1097; H04L 41/22
USPC .......... 715/734–739, 853–855, 969
See application file for complete search history.

(56) References Cited

U.S. PATENT DOCUMENTS

| | | | | |
|---|---|---|---|---|
| 6,538,669 B1* | 3/2003 | Lagueux, Jr. | ......... | G06F 3/0481 711/170 |
| 6,636,250 B1* | 10/2003 | Gasser | .................. | G06F 3/0482 715/733 |
| 6,865,717 B2* | 3/2005 | Wright | .................. | G06F 3/0481 715/733 |
| 8,566,653 B2* | 10/2013 | Merwe | ................ | G06F 11/3006 714/4.5 |
| 2004/0243945 A1* | 12/2004 | Benhase | ................ | G06F 3/0482 715/853 |
| 2005/0154989 A1* | 7/2005 | Maddocks | ............ | G06F 3/0482 715/735 |
| 2009/0019141 A1* | 1/2009 | Bush | .................... | H04L 12/2807 709/223 |
| 2009/0249213 A1* | 10/2009 | Murase | ................. | G06F 9/4443 715/735 |
| 2016/0099844 A1* | 4/2016 | Colgrove | .............. | G06F 3/0484 715/736 |

* cited by examiner

*Primary Examiner* — Andrew L Tank
(74) *Attorney, Agent, or Firm* — Anderson Gorecki LLP

(57) ABSTRACT

A storage system management station includes monitoring software with a GUI. The GUI presents operational status of software, physical devices and interconnecting cabling associated with a logical storage cluster. Graphical representations of physical devices may include line drawings that help to identify the devices and ports to which cabling is connected. Selected types of cabling may be presented in order to simplify the displayed image. An indication of associations between different data center sites and individual physical devices may also be provided. An interface may also be provided for upgrading, enabling, disabling, failing and recovering components. A mapping graphic illustrates the relationship between the virtual-volume and the underlying storage-volume with the LUN ID displayed by the GUI. Multiple clusters can be managed from a single screen.

20 Claims, 11 Drawing Sheets

GRAPHICAL USER INTERFACE FOR STORAGE CLUSTER MANAGEMENT

CROSS-REFERENCE TO RELATED APPLICATIONS

NA

BACKGROUND

Aspects of this disclosure are generally related to electronic data storage systems. An enterprise, service provider or storage vendor may operate a data storage system which includes one or more data centers which may be geographically diverse. The data centers maintain large amounts of data that is made available to many concurrent users. Each data center may include both data storage and computing resources. For example, the computing resources may include clusters of host servers which run various applications and the storage resources may include storage arrays or storage server clusters. Each device in the data storage system may include various subsystems, and a variety of cabling may be used to interconnect devices and subsystems. Moreover, virtual storage devices may be created which have complex relationships with the physical devices and subsystems. Such virtual storage devices may manage virtual volumes of storage and be associated with devices, sub-systems and software located at different data centers.

SUMMARY

All examples and features described herein can be combined in any technically possible way.

In accordance with an aspect, an apparatus comprises: a management station which displays a graphical user interface indicative of operational status of a logical device which manages at least one logical volume of storage, the logical device being associated with multiple physical devices, the graphical user interface generated by program code stored on non-transitory computer-readable media and comprising: program code configured to present a graphical representation of the physical devices associated with the logical device; and program code configured to indicate operational status of at least one of the physical devices associated with the logical device. In some implementations the apparatus further comprises program code configured to present a graphical representation of cabling which interconnects the physical devices associated with the logical device. In some implementations the apparatus further comprises program code configured to indicate operational status of the cabling which interconnects the physical devices associated with the logical device. In some implementations the cabling is presented in accordance with an option that filters based on cabling type. In some implementations the physical devices are located at multiple sites, and the apparatus further comprises program code configured to provide an indication of associations between individual sites and individual physical devices. In some implementations the apparatus further comprises program code configured to present a graphical representation of operational status of software associated with the logical device. In some implementations the apparatus further comprises program code configured to present a graphical representation of operational status of the logical volumes of storage associated with the logical device.

In accordance with an aspect a non-transitory computer-readable memory on which is stored computer program code comprises: program code configured to present a graphical representation of physical devices associated with a logical device which manages at least one logical volume of storage; and program code configured to indicate operational status of at least one of the physical devices associated with the logical device. In some implementations the non-transitory computer-readable memory further comprises program code configured to present a graphical representation of cabling which interconnects the physical devices associated with the logical device. In some implementations the non-transitory computer-readable memory further comprises program code configured to indicate operational status of the cabling which interconnects the physical devices associated with the logical device. In some implementations the cabling is presented in accordance with an option that filters based on cabling type. In some implementations the physical devices are located at multiple sites, and the non-transitory computer-readable memory further comprises program code configured to provide an indication of associations between individual sites and individual physical devices. In some implementations the non-transitory computer-readable memory further comprises program code configured to present a graphical representation of operational status of software associated with the logical device. In some implementations the non-transitory computer-readable memory further comprises program code configured to present a graphical representation of operational status of the logical volumes of storage associated with the logical device.

In accordance with an aspect a method comprises: at a management station, generating a graphical user interface indicative of operational status of a logical device which manages at least one logical volume of storage, the logical device being associated with multiple physical devices, comprising: generating a graphical representation of the physical devices associated with the logical device; and indicating operational status of at least one of the physical devices associated with the logical device. In some implementations the method further comprises generating a graphical representation of cabling which interconnects the physical devices associated with the logical device. In some implementations the method further comprises indicating operational status of the cabling which interconnects the physical devices associated with the logical device. In some implementations the method further comprises presenting the cabling in accordance with an option that filters based on cabling type. In some implementations the physical devices are located at multiple sites, and the method further comprises presenting an indication of associations between individual sites and individual physical devices. In some implementations the method further comprises presenting a graphical representation of operational status of software associated with the logical device.

DETAILED DESCRIPTION

Some aspects may be implemented in whole or in part using one or more computer programs. The computer programs are stored on non-transitory computer-readable memory and implement operations and processes when run on general processors, specialized processors, or a combination of processors. Moreover, various details described herein are provided as context to facilitate understanding and should not be viewed as limiting.

Figure 1:
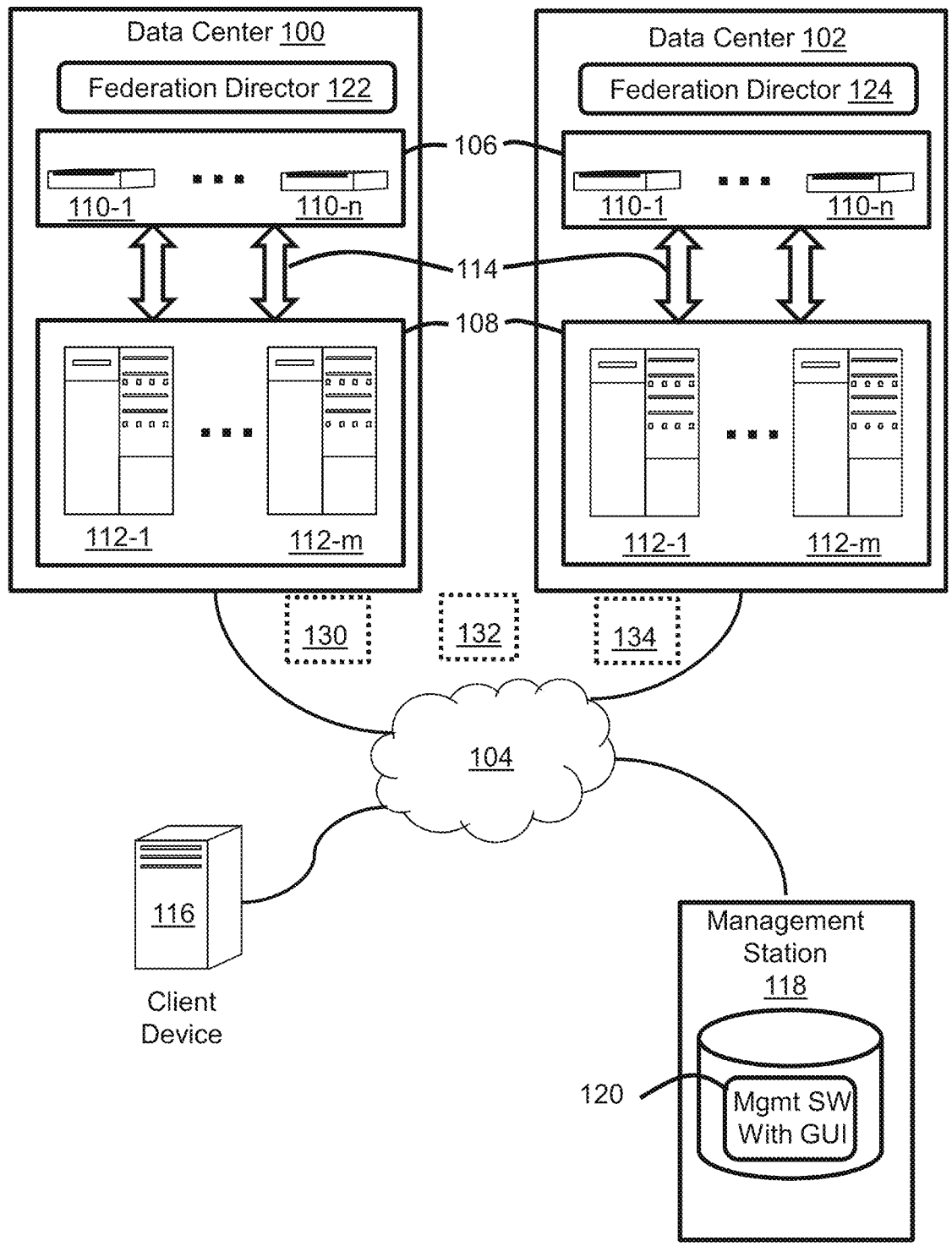
FIG. 1 illustrates a network "cloud" storage environment in which a management station runs storage cluster management software which includes a GUI (graphical user interface).

FIG. 1 illustrates a network "cloud" storage environment in which a management station 118 runs storage cluster management software 120 which includes a GUI. The data storage system could be associated with an enterprise, a service provider, a storage vendor, or some other type of organization. The storage system includes multiple data centers 100, 102 which are interconnected via a network 104. Although two data centers are illustrated, the storage system might include any number of data centers, or no data centers. The network 104 which interconnects the data centers 100, 102 may include public networks, e.g., the internet, private networks, and combinations thereof. Each data center includes computing resources 106 and storage resources 108. The computing resources 106 may include one or more clusters of host servers 110-1 through 110-n, e.g., physical servers arranged in racks. Each host server may support multiple virtual machines, each of which hosts an application. The storage resources 108 may include one or more building blocks of storage such as storage arrays 112-1 through 112-m, clustered storage servers, or other storage devices. Examples of storage arrays include the Symmetrix family of products of EMC Corporation. Within each data center the computing resources 106 are in communication with the storage resources 108 via high bandwidth links 114. A client device 116 which is connected to the network 104 may utilize an application running on one of the virtual machines by communicating with the associated host server. Operation of the hosted application may prompt I/Os such as Read and Write operations which are implemented via communications between the host server and storage resources. The service management station 118 which is connected to the network 104 runs monitoring and management software 120 with a GUI. The management software is stored on a non-transitory computer-readable medium and run by one or more physical processors. The GUI may be presented on a display and configured to indicate the monitored status of data storage system resources. The GUI may allow an operator to remotely configure and control physical and logical devices associated with the data storage system, as will be described in greater detail below.

Figure 2:
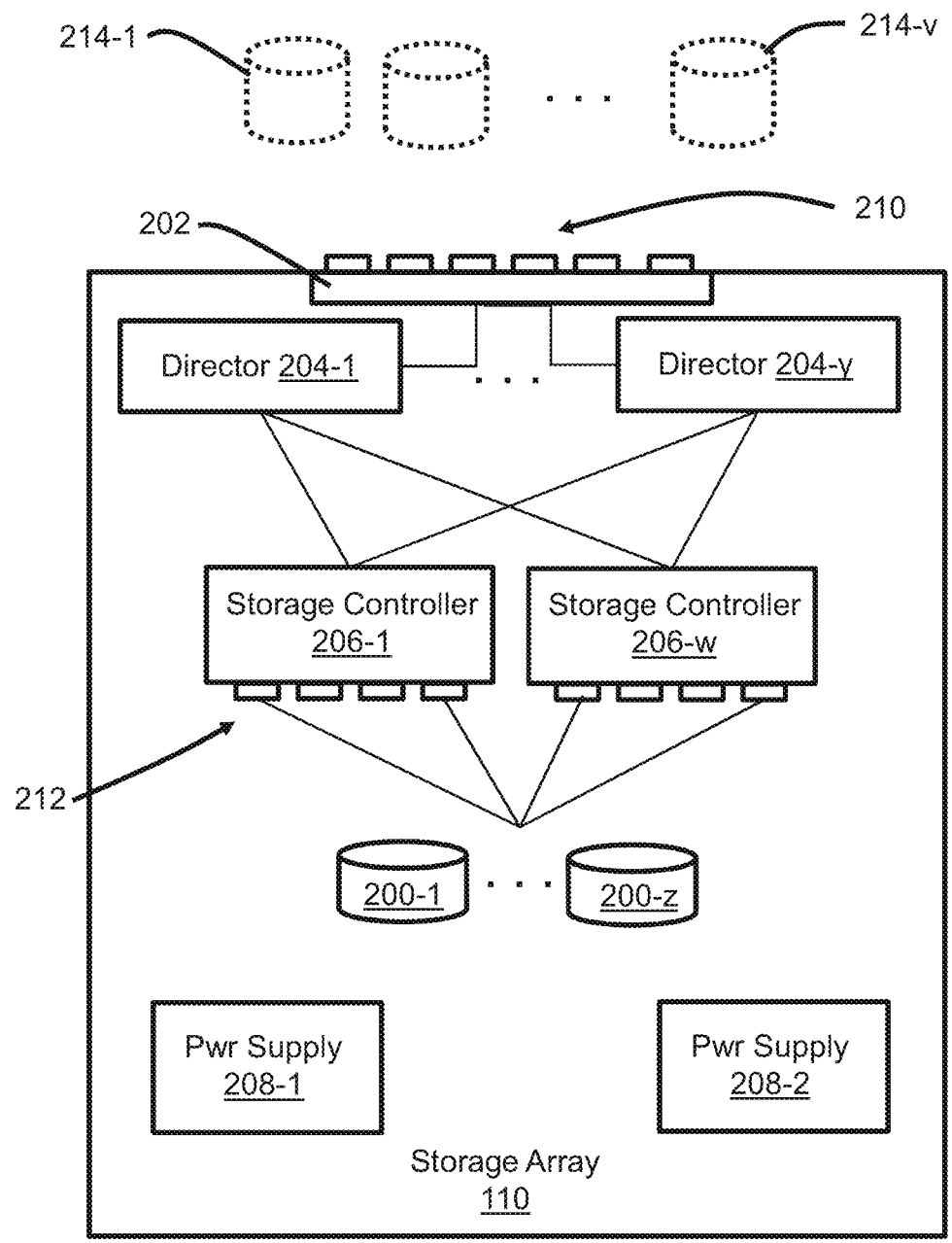
FIG. 2 illustrates a storage cluster building block such as a storage array in greater detail.

FIG. 2 illustrates a storage array 110 in greater detail. The storage array is one example of a storage resource building block. The storage array includes physical data storage devices 200-1 through 200-z which may include but are not limited to SSDs (solid state drives, e.g., flash) and HDDs (hard disk drives, e.g., with spinning magnetic media). Subsystems such as a host interface 202, storage directors 204-1 through 204-y and storage controllers 206-1 through 206-w help to organize, manage and use the physical storage devices. Other subsystems such as redundant power supplies 208-1, 208-2 may also be included.

The host interface 202 may include multiple physical ports 210. The ports may be associated with a wide variety of protocols including but not limited to Fibre Channel, Ficon, Ethernet, iSCSI, FCoE, and combinations thereof. A wide variety of cabling may be used to connect the interfaces with the host servers and other devices via the ports.

The storage controllers 206-1 through 206-w provide the storage directors 204-1 through 204-y with access to the physical storage devices 200-1 through 200-z. The storage controllers include interfaces with multiple ports 212. The ports 212 may be associated with a wide variety of protocols including but not limited to Fibre Channel, iSCSI, Infini-Band, and combinations thereof. A wide variety of cabling may be used to connect the storage controller interfaces with the physical storage devices.

The storage directors 204-1 through 204-y, which are coupled to the host interface and the storage controllers, service I/Os. More particularly, the storage directors present logical volumes 214-1 through 214-v of storage to the applications running on the host servers 110-1 through 110-n (FIG. 1) of the data center. The applications associate I/O requests with the logical volumes. The logical volumes are backed by the physical storage devices 200-1 through 200-z, i.e., the data associated with the logical volumes resides on physical data storage devices. The storage directors use the physical storage devices to maintain the data associated with the presented logical volumes. Each director may be implemented on a separate circuit board and include memory chips, e.g., RAM. The volatile memory of multiple storage directors may be organized as a "global memory" which is accessible to all storage directors. The global memory may have better data access performance characteristics than the storage devices. A cache slot section of global memory is used to temporarily store selected data such that it can be accessed by a storage director directly from the global memory rather than the storage devices. Data initially read from the storage devices in response to a hint or an I/O request by the application on the host server is copied to cache slots in the global memory. When data is requested that is in the cache slots then that cached copy is used to service the I/O request. When data is requested that is not in the cache slots then that data is copied from the storage devices into the cache slots. Generally, data that has not been accessed recently or within a predetermined period of time may be flushed from global memory and written to the storage devices. The storage directors may operate in parallel such that I/O requests received from applications running on the host servers are concurrently serviced. Further, the failure of one director does not cause the storage array to fail because other directors can continue to process I/Os.

Referring to FIGS. 1 and 2, federation director devices 122, 124 associated with each data center enable the storage resources of the different storage arrays to be organized as logical storage resources. Further, the storage resources associated with different data centers may be used to provide logical storage devices which, from the perspective of applications running on client devices, function as if located in a single selected data center. Such logical storage resources and devices are referred to as storage clusters. One example of a federation director device is the EMC VPLEX director. Each federation director presents a standard storage controller target front-end interface, e.g., SCSI, to the host servers. On the back-end, each federation director presents a host-type initiator interface, e.g., SCSI. The federation directors organize the storage resources of one or more data centers as one or more logical storage cluster devices such as storage cluster 130, storage cluster 132 and storage cluster 134. Each storage cluster may include one or more storage engines, where each storage engine may include one or more pairs of physical storage directors, one or more host interfaces with corresponding ports, and redundant power supplies of one or more of the storage arrays. Storage controllers, physical storage devices and cabling of the storage arrays and data centers may be viewed as part of, or associated with, the storage clusters. In other words, a wide variety of resources including software and physical devices and subsystems may be associated with a single storage cluster, including subsystems associated with different devices and devices associated with different data centers. Consequently, the associations between storage clusters and corresponding software, physical devices and subsystems can be complex.

Figure 3:
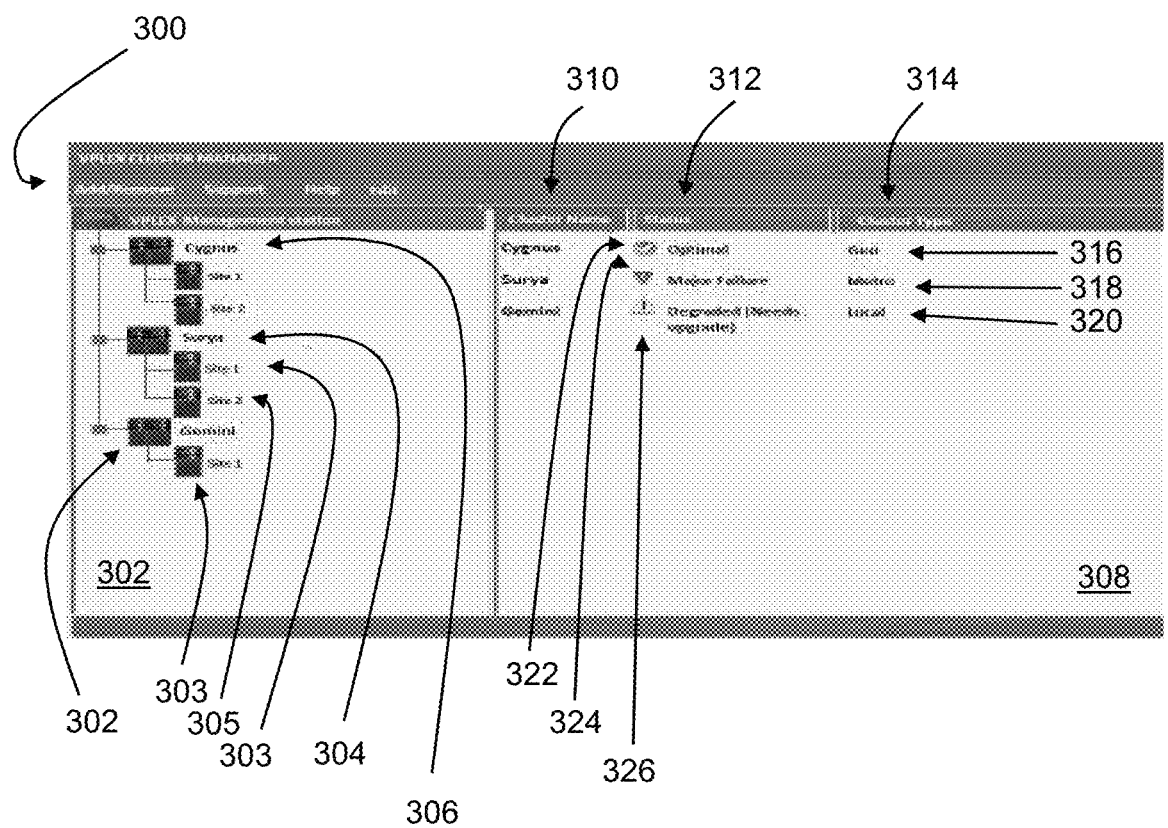
FIG. 3 illustrates a GUI representation of storage cluster status.

Referring to FIGS. 1 and 3, the storage management GUI is configured to display the operational status of storage clusters associated with one or both of the data centers 100, 102. The representation of storage cluster status includes a main window with pull down menus 300. The pull down menus may include Add/Remove, Support, Help and Edit. The Add/Remove pull down allows an operator to add and remove clusters. When a cluster is added the operator may specify the hardware and software resources that are associated with the cluster.

A first sub-window 302 presents icons or other graphical representations 302, 304, 306 corresponding to the currently instantiated clusters 130, 132, 134 which are being monitored and managed. The clusters may be displayed alphabetically by name, hierarchically by importance, chronologically by instantiation date, hierarchically based on status, or any other of a wide variety of ways. Also presented are icons or other graphical representations 303, 305 corresponding to each respective data center 100, 102 with which each storage cluster is associated. In the illustrated example the data centers 100, 102 are named site 1 and site 2 respectively. The storage clusters 130, 132, 134 are named Gemini, Surya and Cygnus. Associations between data centers and storage clusters are indicated with hierarchical positioning of the graphical representations and interconnecting lines.

For example, storage cluster representation 304 is connected to data center representations 303, 305. In the illustrated example both storage cluster 134 (Cygnus) and storage cluster 132 (Surya) are indicated to have associated resources in both data center 100 (site 1) and the data center 102 (site 2), whereas storage cluster 130 (Gemini) only has associated resources in data center 100 (site 1). The storage clusters and data centers can be labeled in accordance with a wide variety of naming conventions, e.g., standardized, organization-defined and operator-defined conventions. This allows the operator to easily assess by name which data centers are associated with each instantiated storage cluster being monitored and managed.

A second sub-window 308 presents an indication of the operational status of the storage clusters depicted in the first sub-window. The second sub-window 308 may include headings such as cluster name 310, status 312 and cluster type 314. The information associated with each storage cluster is arranged in rows in accordance with the headings. For example, row 316 indicates that the cluster named Cygnus has optimal status and is of the geo type. Row 318 indicates that the cluster named Surya has major failure status and is of the metro type. Row 320 indicates that the cluster named Gemini has degraded status and is of the local type. A graphical status indicator may be coupled with the textual description of status. For example, a status indicator 322 including a check mark associated with the color green may be indicative of fully operational status. A status indicator 324 including an exclamation point associated with the color red may be indicative of a failure or major failure status. A status indicator 326 including an exclamation point associated with the color yellow may be associated with status between fully operational and failed, e.g., degraded operation. With regard to the cluster types, a geo cluster may be indicative of a cluster which is associated with physical resources located at different data centers which are geographically diverse, e.g., further than some predetermined threshold distance apart. A metro cluster may be indicative of a cluster which is associated with physical resources located at different data centers which are geographically diverse but with less than the predetermined threshold distance separating the data centers. A local cluster may be indicative of a cluster which is associated with physical resources located at a single data center. A more detailed view of operational status such as those shown in FIGS. 4 and 5 may be obtained by selecting the representation of a cluster in either the first or second sub-window.

Figure 4:
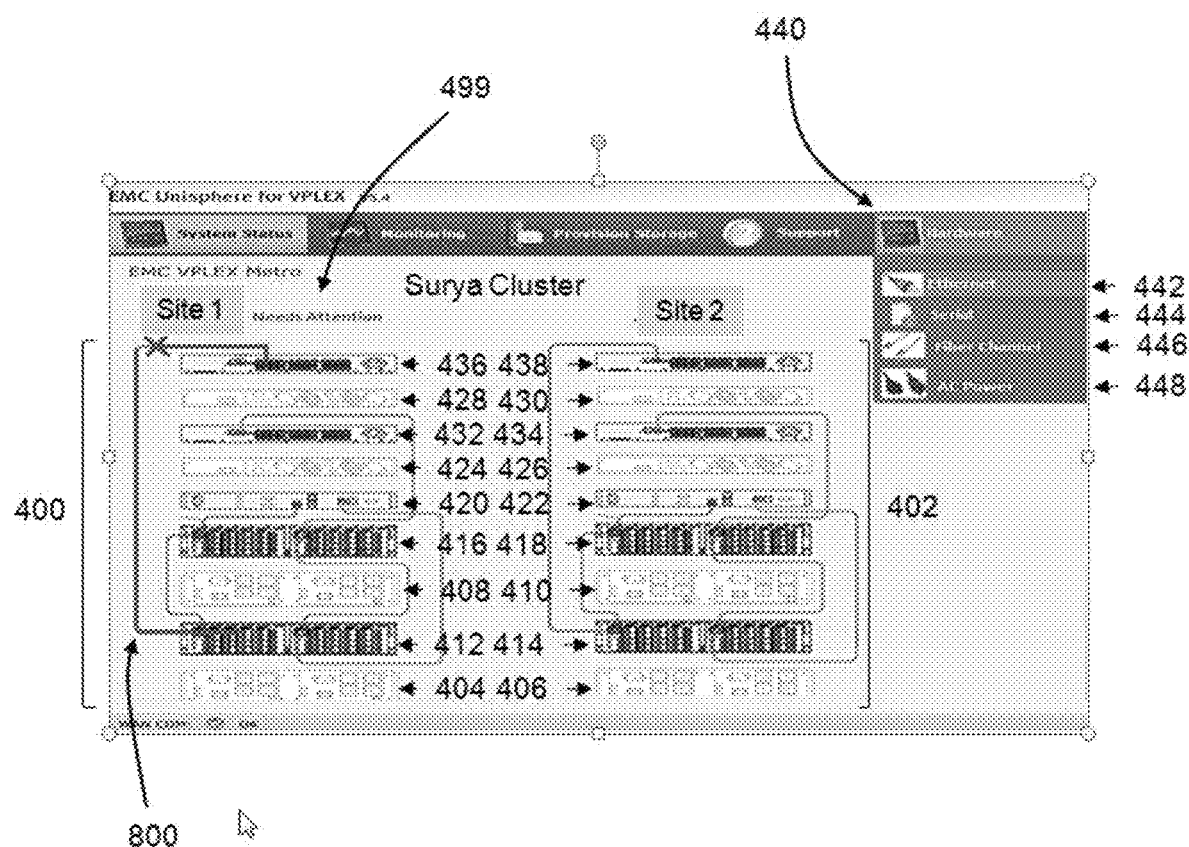
FIG. 4 illustrates a GUI representation of devices and cabling associated with storage clusters, including a cabling alert.

Referring to FIGS. 1 and 4, the storage management GUI is configured to represent devices and sub-systems (hereafter devices and sub-systems referred to collectively as devices) associated with a selected storage cluster. The exemplary window depicts devices and cabling associated with the Surya cluster, and could be presented as an option in response to selection of the Surya icon 304 (FIG. 3). A first group 400 of physical devices and cabling represents corresponding devices and cabling located at the site 1 data center 100 and a second group 402 of physical devices and cabling represents corresponding devices and cabling located at the site 2 data center 102. The groups are labeled as Site 1 and Site 2 in the illustrated example. The groups include representations 404, 406, 408, 410 of SPSs (standby power supplies), representations 412, 414, 416, 418 of VPLEX engines, representations 420, 422 of management servers, representations 424, 426, 428, 430 of UPSs (uninterruptable power supplies), and representations 432, 434, 436, 438 of Fibre Channel switches. The representations may include line drawings of the actual devices with which they are associated. The locations of physical ports may be shown in the representations, and ports may be identified, e.g., by number.

Cabling status may be conveyed graphically in a wide variety of ways, including but not limited to using color and markings. For example, a cable in a degraded state of operation could be shown in yellow and a failed cable could be shown in red. Examples of markings include but are not limited to "X" and "!" for indicating a failed cable and degraded state cable, respectively. A "Needs Attention" indicator 499 is also presented. In the illustrated example, representation 800 of Ethernet cabling at the site 1 data center is shown to be failed. The failed cable status indication corresponds to the Fiber Channel cable connecting the Fiber Channel switch 436 to the VPLEX engine 412. A failed link may be associated with a failed cable or other problem, e.g., anything related to loss of connectivity.

Graphically presenting the physical devices and ports at each end of the failed links may help the operator to more quickly diagnose the problem and be presented on a local display to help personnel at the data centers to take remedial action. A cabling alert is generated whenever there is a cabling problem.

Figure 5:
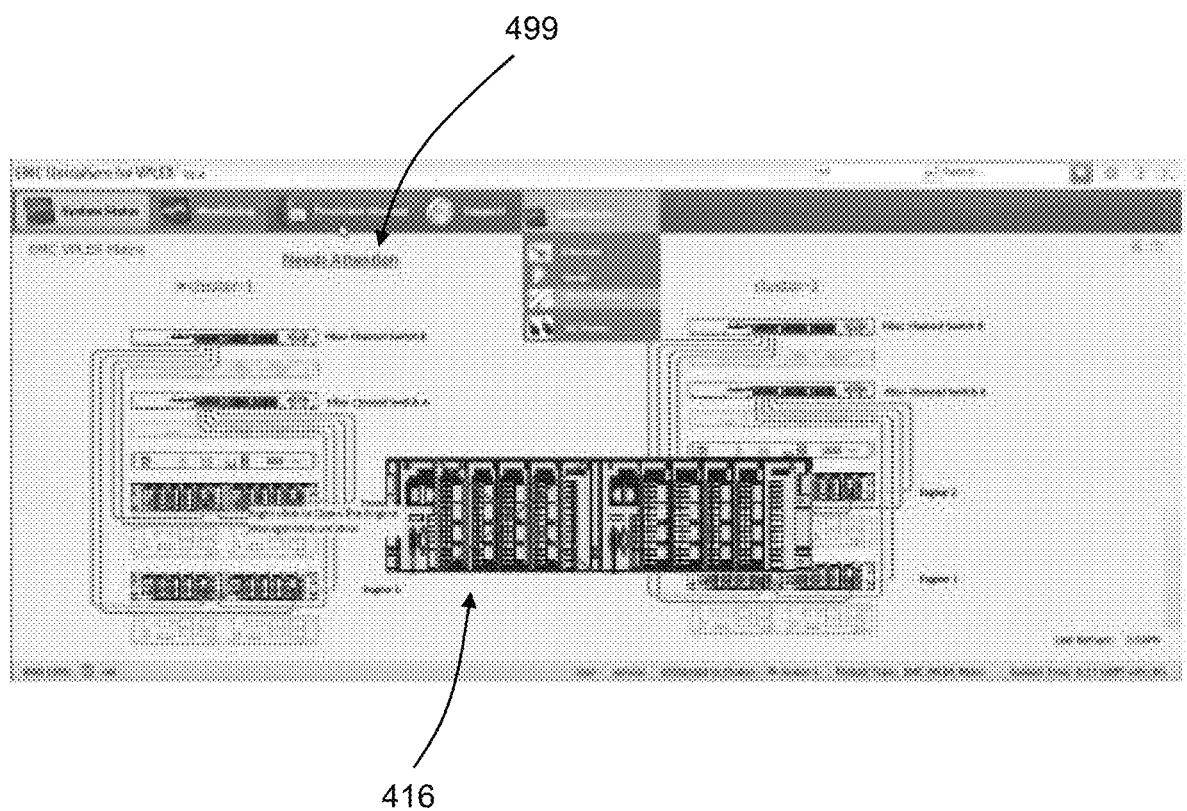
FIG. 5 illustrates a director failure alert.

Referring to FIG. 5, device (component) status may be conveyed graphically in a wide variety of ways, including but not limited to using color and markings. For example, a device in a degraded state of operation could be shown in yellow and a failed device could be shown in red. Examples of markings include but are not limited to "X" and "!" for indicating a failed device and degraded state device, respectively. In the specifically illustrated example the GUI is displaying that a director, VPLEX engine 416, is failed. The "Needs Attention" indicator 499 is presented, and an enlarged representation of the failed device is presented. A device alert is generated whenever there is a device problem. As will be explained below, a user can also fail a component such as the director, and the GUI helps the user to recover the failed component.

Figure 6:
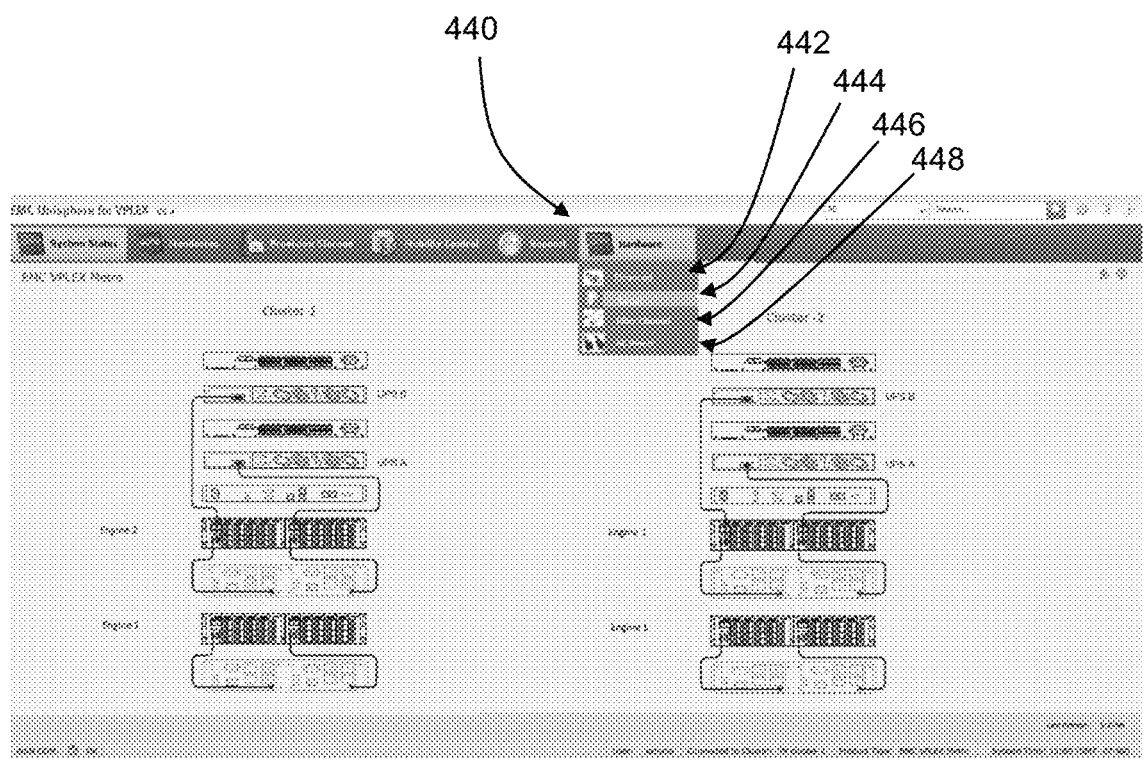
FIG. 6 illustrates a GUI representation of devices and serial cabling associated with storage clusters.

Referring to FIG. 6, specific types of cabling between ports can be selectively presented by the GUI in response to operator input. A mouse hover 440 with drop down options allows the operator to select specific types of cabling to be presented. For example, selecting Serial 444 from the available types causes the serial cabling to be shown with respect to the representations of SPSs, VPLEX engines, the management server, UPSs, and Fibre Channel switches. Other types of cabling are filtered from the depiction. The depiction of devices may be changed in accordance with the cabling selected for presentation. For example, devices which are not connected with the selected type of cabling may be omitted. In a similar manner, selecting Fibre Channel 446 causes the Fibre Channel cabling to be shown, and selecting Ethernet 442 causes the Ethernet cabling to be shown. Note that the GUI accurately depicts the physical ports and other features of the devices and cabling connections. Selectively presenting specific types of cabling can help to provide a less cluttered representation to the operator so that, for example, failed links and associated ports can be more easily identified.

Figure 7:
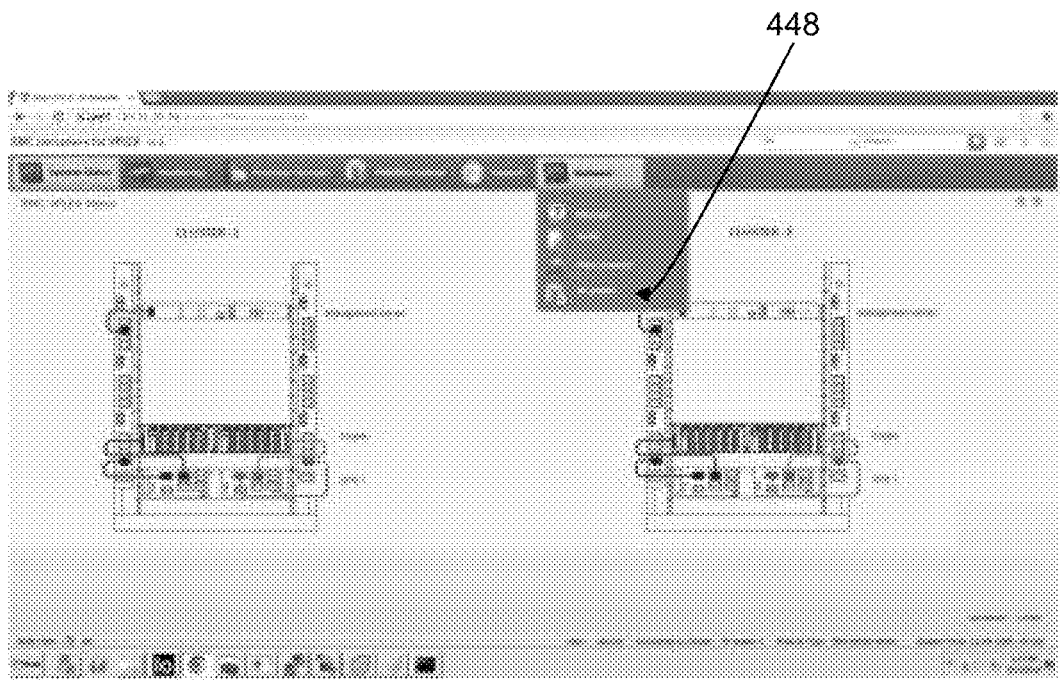
FIG. 7 illustrates a GUI representation of devices and AC power cabling associated with storage clusters.

As shown in FIG. 7, selecting AC Power 448 causes the AC Power cabling to be shown. Note that the depiction of devices is changed to better convey AC power cabling connections to specific components.

Figure 8:
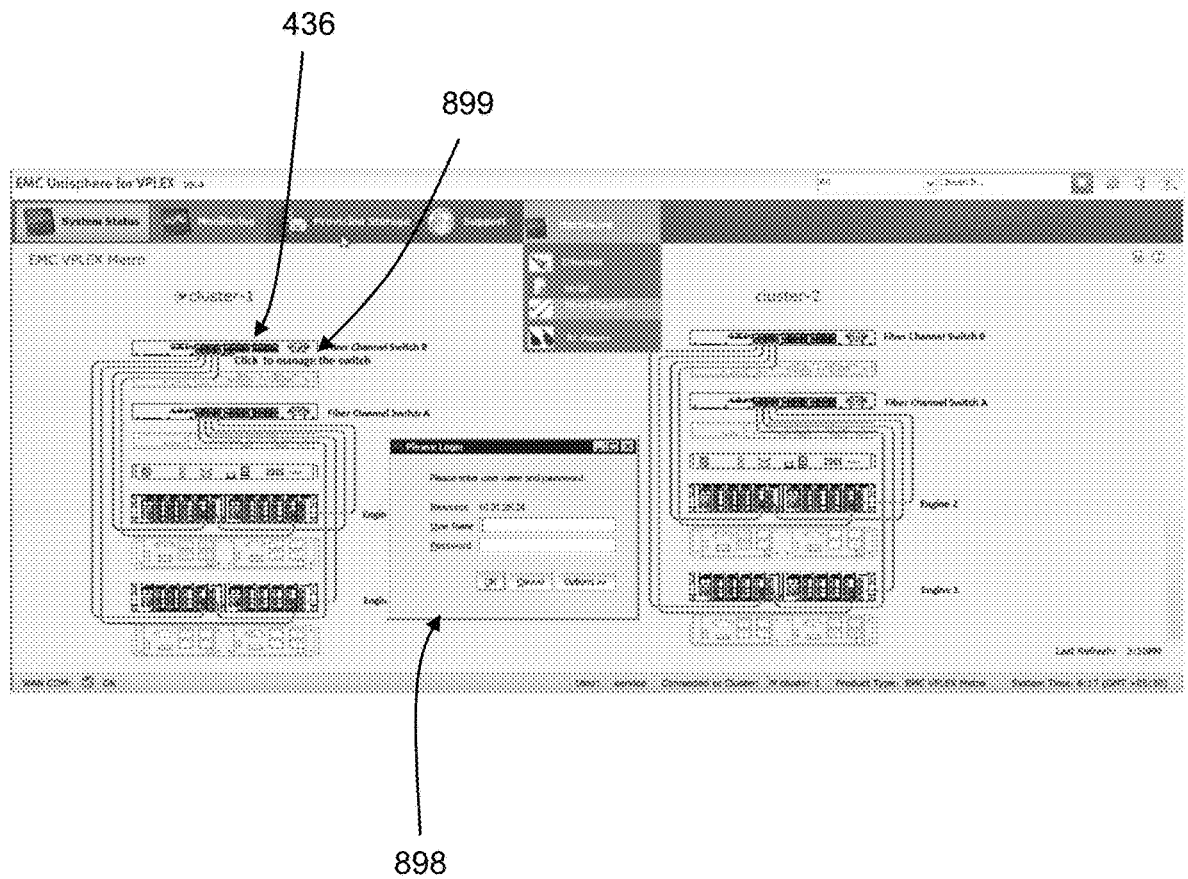
FIG. 8 illustrates a GUI representation of device management login.

Referring now to FIG. 8, a tool tip text 899 is presented when the mouse is hovered over the Fiber Channel Switch representation 436. The tool tip text indicates "click to manage the switch." Once the user clicks the Fiber Channel switch, an authentication window 898 appears and the user is prompted to enter a username and password. On successful login, a device management window opens and the user can then manage the switch, e.g., enable/disable the ports, manage zoning, etc.

Figure 9:
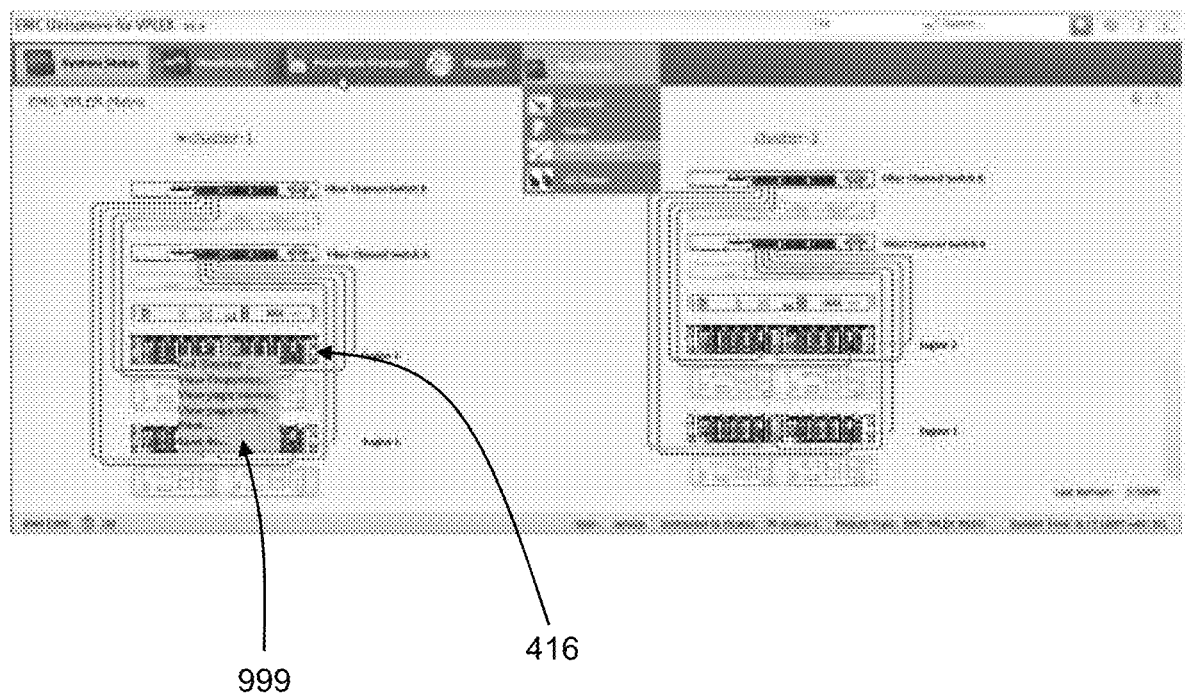
FIG. 9 illustrates a GUI representation of device management options.

Referring to FIG. 9, when an authenticated user right clicks on the engine representation 416, a device management window 999 opens. The device management window presents various management options. For example, a "Fail Director" option will invoke a window where the user can fail the director. A "Properties of the Director..." option allows the user to view the properties of the selected engine. When the user fails the Director, the GUI displays that the Director is failed and a "Needs Attention" is indicated as already shown in FIG. 5.

Figure 10:
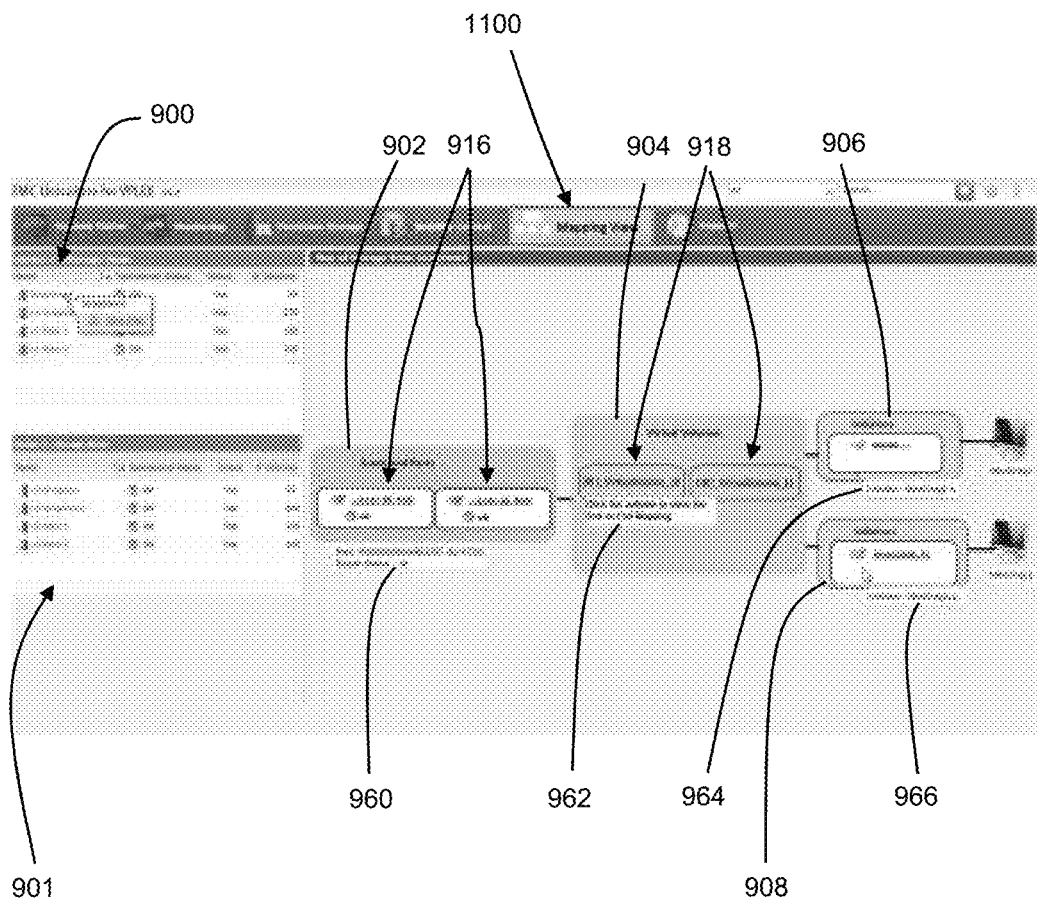
FIGS. 10 and 11 illustrate a GUI mapping view representation of software and logical storage volumes associated with storage clusters.

Referring to FIGS. 1 and 10, the storage management GUI is configured to provide a representation of the status of software and logical storage volumes associated with storage clusters, including volume to LUN mapping described in greater detail below. The exemplary window conveys the status of the software and logical storage volumes of the Surya cluster, and could be presented when the mapping view 1100 option (FIG. 10) is clicked. The status window includes sections 900, 901 indicating status of storage views, a section 902 status of front end ports, a section 904 indicating status of virtual volumes, and sections 906, 908 indicating status of initiators. A separate graphic 916 is presented for each front end port. The front end port graphic identifies the port and indicates status, e.g., with green, red and yellow to indicate fully operation, failed and degraded operation. Additional information about an individual front end port can be obtained by selecting the graphic (icon) associated with that port. A separate graphic 918 is presented for each virtual (logical) volume associated with the cluster. The graphic identifies the volume id and indicates status, e.g., with green, red and yellow to indicate fully operation, failed and degraded operation.

Additional information about an individual front end port, virtual volume or initiator can be obtained via respective tool-tip-texts 960, 962, 964, 966.

Figure 11:
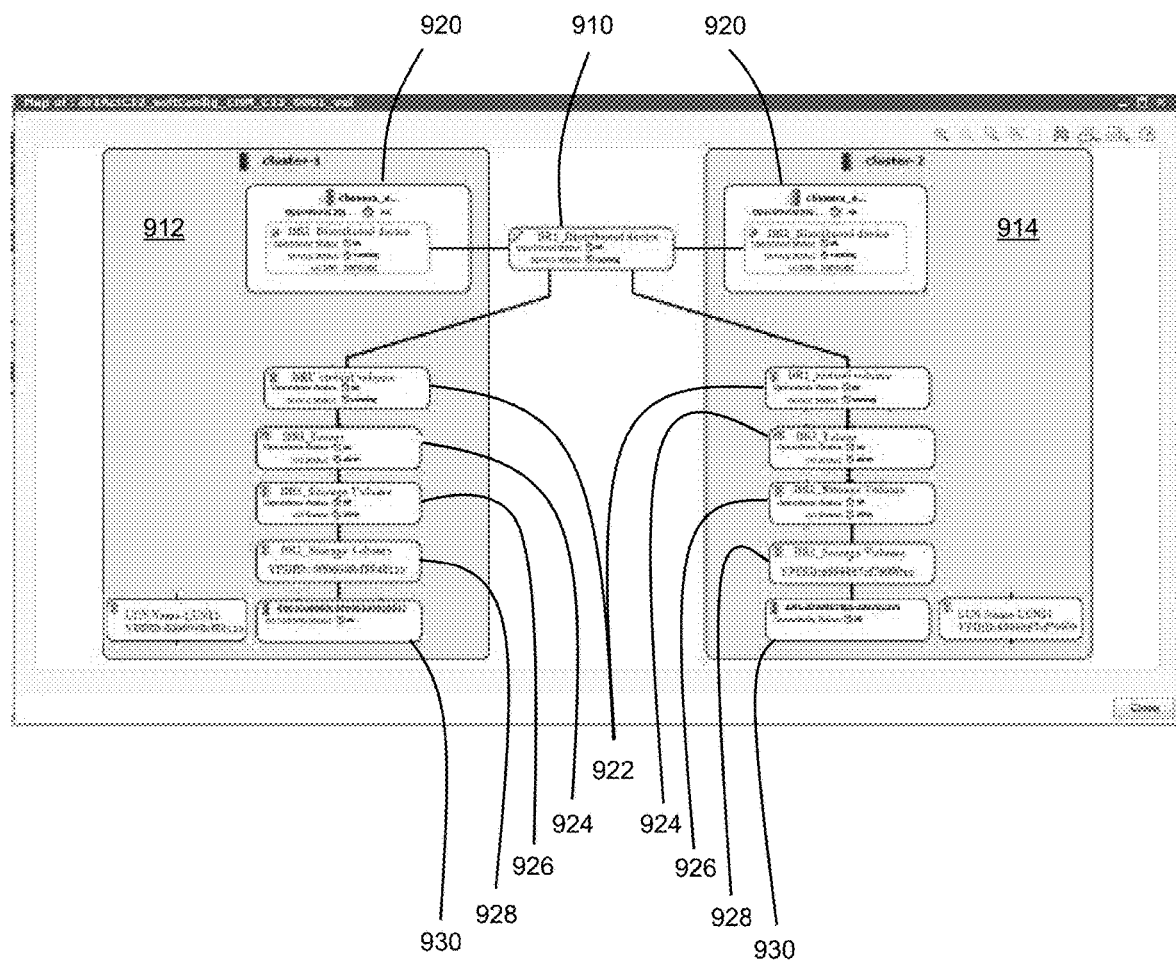

FIG. 11 illustrates the result of use of a virtual volume tool-tip-text 970. A section 910 indicating status of the distributed device (storage cluster), and sections 912, 914 indicating status of software and logical devices associated with the cluster at each data center. A storage view is a logical grouping of front-end ports, registered initiators (hosts), and virtual volumes used to map and mask LUNs. Storage views are used to control host access to storage. In order for hosts to access virtual volumes, the volumes must be in a storage view. A storage view includes at least one initiator, at least one virtual volume, and at least one FE port. Initiators are added to a storage view via GUI. Virtual volumes are added to a storage view via GUI. Ports are added to a storage view via GUI.

Sections 912, 914 include separate graphics 920, 922, 924, 926, 928, 930 associated respectively with each of the distributed device, individual devices, extents, the storage volume, LUN name VPDID, and storage resource, e.g., Symmetrix and Clariion. The graphics may include IDs and indicate status, e.g., with green, red and yellow to indicate fully operation, failed and degraded operation. Additional information about an individual volume can be obtained by selecting the graphic (icon) associated with that volume. Further, reboot and reconfiguration options may be presented. For example, software associated with a storage director could be restarted remotely without necessarily restarting software associated with other subsystems of the storage array.

A mapping graphic illustrates the relationship between the virtual-volume and the underlying storage-volume with the LUN ID displayed by the GUI. The GUI also shows the LUN details of the storage-volume. When mapping view 1100 (FIG. 10) is clicked, a window opens which details the information as shown.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a management station that displays a graphical user interface generated by program code stored on non-transitory computer-readable media and comprising:
program code that visually indicates degraded or failed operational status of a logical device that manages at least one logical volume of storage, wherein the logical device is based on multiple physical devices and is part of a storage system that comprises multiple other logical devices;
program code that provides a graphical representation of the physical devices associated with the logical device; and visually indicates degraded or failed operational status of at least one of the physical devices associated with the degraded or failed logical device; and
program code that selects and remotely reboots the degraded or failed physical device based on the indicated degraded or failed operational status of the logical device and the physical device, whereby problems with logical devices are more efficiently associated with failed or degraded physical devices and remedied.

2. The apparatus of claim 1 further comprising program code configured to present a graphical representation of cabling which interconnects the physical devices associated with the logical device.

3. The apparatus of claim 2 further comprising program code configured to indicate operational status of the cabling which interconnects the physical devices associated with the logical device.

4. The apparatus of claim 3 wherein the cabling is presented in accordance with an option that filters based on cabling type.

5. The apparatus of claim 1 wherein the physical devices are located at multiple sites, and further comprising program code configured to provide an indication of associations between individual sites and individual physical devices.

6. The apparatus of claim 1 further comprising program code configured to present a graphical representation of operational status of software associated with the logical device.

7. The apparatus of claim 1 further comprising program code configured to present a graphical representation of operational status of the logical volumes of storage associated with the logical device.

8. A non-transitory computer-readable memory on which is stored computer program code comprising:
program code that visually indicates degraded or failed operational status of a logical device that manages at least one logical volume of storage, wherein the logical device is based on multiple physical devices and is part of a storage system that comprises multiple other logical devices;
program code that provides a graphical representation of physical devices associated with the logical device; and visually indicates degraded or failed operational status of at least one of the physical devices associated with the degraded or failed logical device; and
program code that selects and remotely reboots the degraded or failed physical device based on the indicated degraded or failed operational status of the logical device and the physical device, whereby problems with logical devices are more efficiently associated with failed or degraded physical devices and remedied.

9. The non-transitory computer-readable memory of claim 8 further comprising program code configured to present a graphical representation of cabling which interconnects the physical devices associated with the logical device.

10. The non-transitory computer-readable memory of claim 9 further comprising program code configured to indicate operational status of the cabling which interconnects the physical devices associated with the logical device.

11. The non-transitory computer-readable memory of claim 10 wherein the cabling is presented in accordance with an option that filters based on cabling type.

12. The non-transitory computer-readable memory of claim 8 wherein the physical devices are located at multiple sites, and further comprising program code configured to provide an indication of associations between individual sites and individual physical devices.

13. The non-transitory computer-readable memory of claim 8 further comprising program code configured to present a graphical representation of operational status of software associated with the logical device.

14. The non-transitory computer-readable memory of claim 8 further comprising program code configured to present a graphical representation of operational status of the logical volumes of storage associated with the logical device.

15. A method comprising:
at a management station, generating a graphical user interface indicative of operational status of a logical device which manages at least one logical volume of storage, the logical device being associated with multiple physical devices, comprising:
visually indicating degraded or failed operational status of the logical device;
generating a graphical representation of the physical devices associated with the degraded or failed logical device;
visually indicating degraded or failed operational status of at least one of the physical devices associated with the logical device; and
selecting and remotely rebooting the degraded or failed physical device based on the indicated degraded or failed operational status of the logical device and the physical device, whereby problems with logical devices are more efficiently associated with failed or degraded physical devices and remedied.

16. The method of claim 15 further comprising generating a graphical representation of cabling which interconnects the physical devices associated with the logical device.

17. The method of claim 16 further comprising indicating operational status of the cabling which interconnects the physical devices associated with the logical device.

18. The method of claim 17 further comprising presenting the cabling in accordance with an option that filters based on cabling type.

19. The method of claim 15 wherein the physical devices are located at multiple sites, and further comprising presenting an indication of associations between individual sites and individual physical devices.

20. The method of claim 15 further comprising presenting a graphical representation of operational status of software associated with the logical device.

* * * * *